United States Patent
Jung et al.

(10) Patent No.: US 9,287,585 B2
(45) Date of Patent: Mar. 15, 2016

(54) ELECTROLYTE FOR RECHARGEABLE LITHIUM BATTERY AND RECHARGEABLE LITHIUM BATTERY

(71) Applicant: Samsung SDI Co., Ltd., Yongin-si, Gyeonggi-do (KR)

(72) Inventors: Euy-Young Jung, Yongin-si (KR); Duck-Chul Hwang, Yongin-si (KR); Jong-Hwa Lee, Yongin-si (KR); In-Tae Mun, Yongin-si (KR); Sae-Weon Roh, Yongin-si (KR); So-Hyun Hur, Yongin-si (KR); Yong-Chul Park, Yongin-si (KR); Jeom-Soo Kim, Yongin-si (KR); Jae-Yul Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/561,119

(22) Filed: Dec. 4, 2014

(65) Prior Publication Data
US 2015/0093602 A1 Apr. 2, 2015

Related U.S. Application Data

(63) Continuation of application No. 11/765,101, filed on Jun. 19, 2007, now Pat. No. 8,906,559.

(30) Foreign Application Priority Data

Apr. 5, 2007 (KR) .................. 10-2007-0033743

(51) Int. Cl.
| | | |
|---|---|---|
| *H01M 10/0567* | (2010.01) | |
| *H01M 4/525* | (2010.01) | |
| *H01M 4/58* | (2010.01) | |
| *H01M 10/0525* | (2010.01) | |
| *H01M 4/583* | (2010.01) | |
| *H01M 10/052* | (2010.01) | |
| *H01M 4/485* | (2010.01) | |
| *H01M 4/505* | (2010.01) | |

(52) U.S. Cl.
CPC .......... *H01M 10/0567* (2013.01); *H01M 4/525* (2013.01); *H01M 4/583* (2013.01); *H01M 4/5815* (2013.01); *H01M 10/052* (2013.01); *H01M 10/0525* (2013.01); *H01M 4/485* (2013.01); *H01M 4/505* (2013.01); *H01M 4/5825* (2013.01); *H01M 2220/30* (2013.01); *H01M 2300/0025* (2013.01); *Y02E 60/122* (2013.01)

(58) Field of Classification Search
CPC .................. H01M 10/0567; H01M 10/0525; H01M 10/052; H01M 2220/30; H01M 2300/0025; H01M 4/485; H01M 4/505; H01M 4/525; H01M 4/5815; H01M 4/5825; Y02E 60/122

See application file for complete search history.

(56) References Cited

U.S. PATENT DOCUMENTS

| | | | |
|---|---|---|---|
| 4,544,615 A | 10/1985 | Shishikura et al. | |
| 7,985,502 B2 * | 7/2011 | Abe .................. | H01M 10/0525 429/200 |
| 2006/0035144 A1 * | 2/2006 | Shimizu ............ | H01M 10/0525 429/188 |
| 2007/0111099 A1 * | 5/2007 | Nanjundaswamy .... | H01M 4/06 429/231.95 |

FOREIGN PATENT DOCUMENTS

| | | |
|---|---|---|
| JP | 2000-124077 | 4/2000 |
| KR | 2005-20067 | 3/2005 |
| KR | 2005-29971 | 3/2005 |
| KR | 2006-129042 | 12/2006 |

* cited by examiner

*Primary Examiner* — Raymond Alejandro
(74) *Attorney, Agent, or Firm* — Lewis Roca Rothgerber Christie LLP

(57) ABSTRACT

An electrolyte for a rechargeable lithium battery includes a non-aqueous organic solvent; a lithium salt; and an additive including vinylene carbonate, fluoroethylene carbonate, and a nitrile-based compound represented by Formula 1:

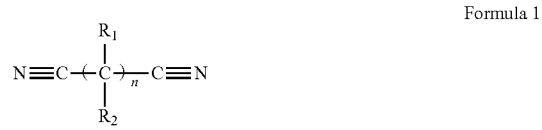

Formula 1 wherein n ranges from 1 to 12 and $R_1$ and $R_2$ are independently a halogen, a hydrogen, or an alkyl group. Further, the alkyl group can be $C_mH_{(2m+1)}$, in which m ranges from 1 to 10. The electrolyte for a rechargeable lithium battery improves storage stability of the rechargeable lithium battery at a high temperature. And, a rechargeable lithium battery including the electrolyte has improved storage stability.

16 Claims, 1 Drawing Sheet

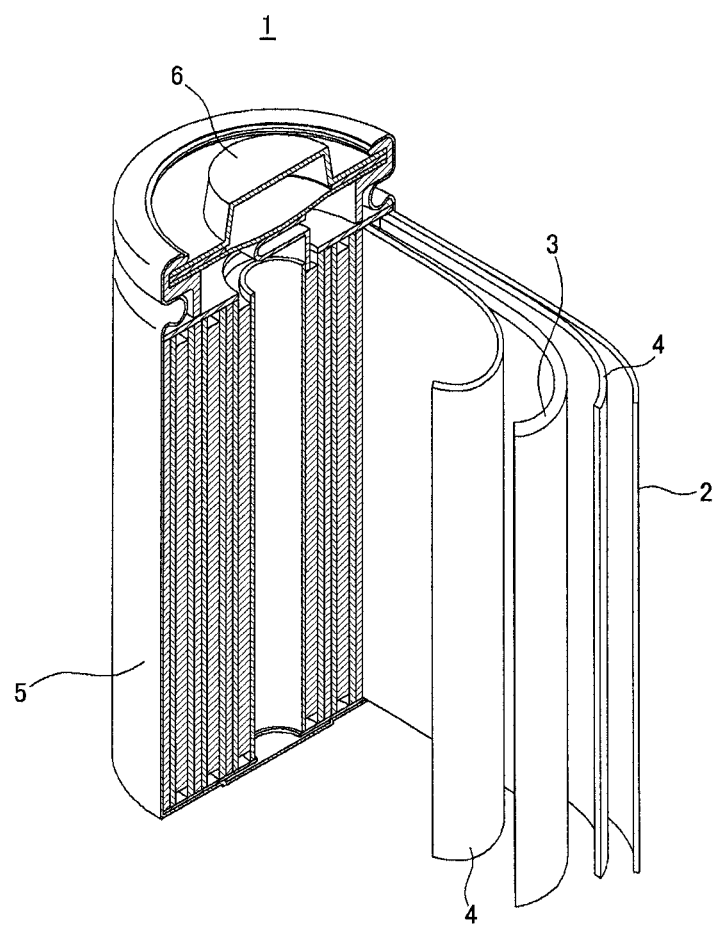

ELECTROLYTE FOR RECHARGEABLE LITHIUM BATTERY AND RECHARGEABLE LITHIUM BATTERY

CROSS-REFERENCE TO RELATED APPLICATION

This application is a continuation of U.S. patent application Ser. No. 11/765,101, filed Jun. 19, 2007, which claims priority to and the benefit of Korean Patent Application No. 10-2007-0033743, filed Apr. 5, 2007, the entire content of both of which is incorporated herein by reference.

BACKGROUND OF THE INVENTION

1. Field of the Invention

Aspects of the present invention relate to an electrolyte for a rechargeable lithium battery and a rechargeable lithium battery including the same. More particularly, the present invention relates to an electrolyte for a rechargeable lithium battery having excellent storage stability at a high temperature, and a rechargeable lithium battery including the same.

2. Description of the Related Art

A lithium rechargeable battery has recently drawn attention as a power source of a small portable electronic device. Such a secondary battery uses an organic electrolyte solution to achieve a discharge voltage twice as high as a conventional battery using an alkali aqueous solution, and accordingly has a high energy density. For a positive active materials of a rechargeable lithium battery, lithium-transition element composite oxides being capable of intercalating lithium, such as $LiCoO_2$, $LiMn_2O_4$, $LiNiO_2$, $LiNi_{1-x}Co_xO_2$ ($0<x<1$), $LiMnO_2$, etc., have been researched. As for a negative active material of a rechargeable lithium battery, various carbon-based materials, such as artificial and natural graphite, and hard carbon, have been used, which may all intercalate and deintercalate lithium ions. Positive and negative electrodes of a rechargeable lithium battery may be unstable depending on a charge state at a temperature of 25° C. or more and may thereby induce decomposition of a salt of the electrolyte, an organic solvent, and the positive and negative active materials. This decomposition causes serious deterioration of battery stability and safety. In order to counter such decomposition, an electrolyte including 0.001 to 0.1 mol/L of an organic compound having at least two cyano groups has been suggested. However, sufficient stability and safety have not been realized. High-capacity batteries are required to meet the demands of customers, while high-level stability and safety are also required, and it is difficult to satisfy both requirements.

SUMMARY OF THE INVENTION

An embodiment of the present invention provides an electrolyte for a rechargeable lithium battery that improves storage stability of the rechargeable lithium battery at a high temperature. Another embodiment of the present invention provides a rechargeable lithium battery including the electrolyte.

According to an embodiment of the present invention, provided is an electrolyte for a rechargeable, or secondary, lithium battery that includes a non-aqueous organic solvent; a lithium salt; and an additive including vinylene carbonate, fluoroethylene carbonate, and a nitrile-based compound represented by Formula 1:

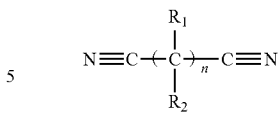

Formula 1 wherein n ranges from 1 to 12 and R1 and R2 are independently a halogen, a hydrogen, or an alkyl group or any other obvious variant. The alkyl group may be described as $C_mH_{(2m+1)}$ in which m ranges from 1 to 10.

The vinylene carbonate is present in an amount of 0.01 to 9 wt % based on the total weight of the electrolyte. According to another embodiment, the vinylene carbonate is present in an amount of 0.5 to 5 wt % based on the total weight of the electrolyte.

The fluoroethylene carbonate is present in an amount of 0.1 to 7 wt % based on the total weight of the electrolyte. According to another embodiment, the fluoroethylene carbonate is present in an amount of 0.5 to 5 wt % based on the total weight of the electrolyte.

The nitrile-based compound of the above Formula 1 is present in an amount of 0.005 to 10 wt % based on the total weight of the electrolyte. According to another embodiment, the compound is present in an amount of 0.01 to 5 wt % based on the total weight of the electrolyte.

The nitrile-based compound may be selected from the group consisting of succinonitrile, glutaronitrile, adiponitrile, pimelonitrile, suberonitrile, and combinations thereof. According to another embodiment, the nitrile-based compound may be selected from the group consisting of, glutaronitrile, adiponitrile, pimelonitrile, suberonitrile, and combinations thereof. According to yet another embodiment, the nitrile-based compound may be adiponitrile.

According to an embodiment of the present invention, provided is a rechargeable lithium battery including a positive electrode, a negative electrode, and the above electrolyte.

The positive electrode of the rechargeable lithium battery has an active mass density ranging from 3.7 g/cc to 4.2 g/cc and a charging cut-off voltage ranging from 4.3 to 4.5V. The rechargeable lithium battery may be charged at a high voltage.

The positive active material may be selected from the group consisting of compounds represented by Formulas 2 to 12 and mixtures thereof.

Formula 2 wherein, $0.95 \leq a1 \leq 1.1$, $0 \leq b1 \leq 0.9$, $0 \leq c1 \leq 0.5$, and $0 \leq d1 \leq 0.2$, and M1 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof. Further, d1 may be $0.001 \leq d1 \leq 0.2$.

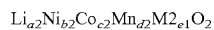

Formula 3 wherein $0.95 \leq a2 \leq 1.1$, $0 \leq b2 \leq 0.9$, $0 \leq c2 \leq 0.5$, $0 \leq d2 \leq 0.5$, and $0 \leq e1 \leq 0.2$, and M2 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof. Further, e1 may be $0.001 \leq e1 \leq 0.2$.

$Li_{a3}Mn_2M3_{b3}O_4$  Formula 4 wherein 0.95≤a3≤1.1, and 0≤b3≤0.2, and

M3 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof. Further, b3 may be 0.001≤b3≤0.2.

$GS_2$  Formula 5 wherein G is Ti or Mo.

$LiJS_2$  Formula 6 wherein J is Ti or Mo.

$V_2O_5$  Formula 7

$LiV_2O_5$  Formula 8

$LiTO_2$  Formula 9 wherein T is selected from the group consisting of Cr, V, Fe, Ti, Sc, Y, and combinations thereof.

$LiNiVO_4$  Formula 10

$Li_{(3-a4)}M'_2(PO_4)_3$  Formula 11 wherein 0<a4<3, M' is selected from the group consisting of V, Cr, Mn, Co, Ni, Cu, and combinations thereof.

$Li_{(3-a7)}Fe_2(PO_4)_3$  Formula 12 wherein 0≤a≤2.

In the rechargeable lithium battery, the negative active material may include at least one selected from the group consisting of a carbonaceous material, a lithium metal, a lithium alloy, a material being capable of forming a lithium-containing compound, and combinations thereof. According to one embodiment, the carbonaceous material may be appropriate for the negative active material. The carbonaceous material has an Lc (crystallite size) of at least 10 nm, and exhibits an exothermic peak at 700° C. or more.

The crystalline carbon may be a carbon prepared by carbonizing mesophase spherical particles and performing a graphitizing operation on the carbonized material. Further, the carbonaceous material may be a graphite fiber prepared by carbonizing a mesophase pitch fiber and performing a graphitizing operation on the carbonized material.

Additional aspects and/or advantages of the invention will be set forth in part in the description which follows and, in part, will be obvious from the description, or may be learned by practice of the invention.

BRIEF DESCRIPTION OF THE DRAWING

These and/or other aspects and advantages of the invention will become apparent and more readily appreciated from the following description of the embodiments, taken in conjunction with the accompanying drawing of which:

FIG. 1 is a schematic cross-sectional view of a rechargeable lithium battery.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The exemplary embodiments are described below in order to explain aspects of the present invention.

FIG. 1 is a schematic cross-sectional view of a rechargeable lithium battery according to an embodiment of the present invention. Referring to FIG. 1, the rechargeable lithium battery 1 is constructed of a negative electrode 2, a positive electrode 3, a separator 4 disposed between the positive electrode 3 and the negative electrode 2 The rechargeable lithium battery 1 also includes a cell case 5 and a sealing member 6 sealing the cell case 5. An electrolyte fills the cell case 5 and is sealed therein by the sealing member 6 so as to electrically connect the negative electrode 2 and the positive electrode 3.

Aspects of the present invention relate to an electrolyte for a rechargeable lithium battery that has excellent storage stability at a high temperature. The electrolyte for a rechargeable lithium battery includes a non-aqueous organic solvent, a lithium salt, and an additive. The additive includes vinylene carbonate, fluoroethylene carbonate, and a nitrile-based compound represented by Formula 1:

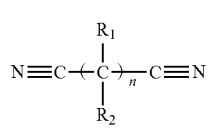

Formula 1 wherein n ranges from 1 to 12 and $R_1$ and $R_2$ are independently a halogen, a hydrogen, or an alkyl group or any other obvious variant. The alkyl group can be described as $C_mH_{(2m+1)}$ in which m ranges from 1 to 10. When n is greater than 1, R1 and R2 may repeat or R1 and R2 may be formed of the halogen, hydrogen, or the alkyl group and not repeat. Further, when n is greater than 1, R1 and R2 may include different halogens and/or alkyl groups of different lengths.

The nitrile-based compound present in the additive may be selected from the group consisting of succinonitrile, glutaronitrile, adiponitrile, pimelonitrile, suberonitrile, and combinations thereof. According to another embodiment, the nitrile-based compound may be selected from the group consisting of, glutaronitrile, adiponitrile, pimelonitrile, suberonitrile, and combinations thereof. According to yet another embodiment, the nitrile-based compound may be adiponitrile.

The vinylene carbonate is present in the additive at an amount of 0.01 to 9 wt % based on the total weight of the electrolyte. According to another embodiment, the vinylene carbonate is present in the additive at an amount of 0.5 to 5 wt % based on the total weight of the electrolyte. The fluoroethylene carbonate is present in the additive at an amount of 0.1 to 7 wt % based on the total weight of the electrolyte. According to another embodiment, the fluoroethylene carbonate is present in the additive at an amount of 0.5 to 5 wt % based on the total weight of the electrolyte. The nitrile-based compound of the above Formula 1 is present in the additive at an amount of 0.005 to 10 wt % based on the total weight of the electrolyte. According to another embodiment, the nitrile-based compound is present in the additive at an amount of 0.01 to 5 wt % based on the total weight of the electrolyte.

When the amount of the vinylene carbonate, fluoroethylene carbonate, or nitrile-based compound is out of the above-described ranges, an open circuit voltage (OCV) of the resultant battery decreases below the value of 4.2V.

In the electrolyte, the non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), etc. Examples of the ester-based solvent may include n-methyl acetate, n-ethyl acetate, n-propyl acetate, dimethylacetate, methylpropionate, ethylpropionate, γ-butyrolactone, decanolide, valerolactone, mevalonolactone, caprolactone, etc. Examples of the ether-based solvent include dibutyl ether, tetraglyme, diglyme, dimethoxyethane, 2-methyltetrahydrofuran, tetrahydrofuran, etc. Examples of the ketone-based solvent include cyclohexanone, etc. Examples of the alcohol-based solvent include ethyl alcohol, isopropyl alcohol, etc., and examples of the aprotic solvent include nitriles, such as R—CN (wherein R is a C2 to C20 linear, branched, or cyclic hydrocarbon, a carbon chain including double bonds, an aromatic ring, or a carbon chain including ether bonds), amides such as dimethylformamide, dioxolanes, such as 1,3-dioxolane, sulfolanes, etc. The non-aqueous organic solvent may be used singularly or in a mixture. When the organic solvent is used in a mixture, a mixture ratio may be controlled in accordance with a desirable battery performance.

The carbonate-based solvent may include a mixture of a cyclic carbonate and a linear carbonate. The cyclic carbonate and the chain carbonate are mixed together in a volume ratio of 1:1 to 1:9, and when the mixture is used as an electrolyte, the electrolyte performance may be enhanced.

In addition, the electrolyte according to aspects of the present invention may further include mixtures of carbonate-based solvents and aromatic hydrocarbon-based solvents. The carbonate-based solvents and the aromatic hydrocarbon-based solvents are preferably mixed together in a volume ratio of 1:1 to 30:1.

The aromatic hydrocarbon-based organic solvent may be represented by Formula 13.

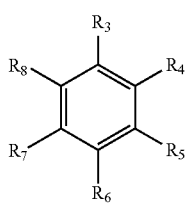

Formula 13 wherein $R_3$ to $R_8$ are independently selected from the group consisting of hydrogen, a halogen, a C1 to C10 alkyl, a haloalkyl, and combinations thereof.

The aromatic hydrocarbon-based non-aqueous organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous organic solvent in the electrolyte may further include an overcharge inhibition additive such as ethylene carbonate, pyrocarbonate, etc.

The lithium salt is dissolved in the non-aqueous organic solvent to supply lithium ions in the battery. The lithium salt is the basis of operation of the rechargeable lithium battery, and the lithium salt facilitates transmission of lithium ions between the positive and negative electrodes. Non-limiting examples of the lithium salt include at least one supporting electrolyte salt selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_4$, $LiAlCl_4$, $LiN(C_xF_{2x+1}SO_2)(C_yF_{2y+1}SO_2)$ (in which x and y are positive integers), LiCl, LiI, lithium bisoxalate borate, and combinations thereof. The lithium salt may be used at a 0.1 to 2.0M concentration. When the lithium salt concentration is less than 0.1M, electrolyte performance may decrease due to low electrolyte conductivity, whereas when it is more than 2.0M, lithium ion mobility may be reduced due to an increase of the viscosity of the electrolyte.

A rechargeable lithium battery according to aspects of the present invention may include the electrolyte as described above and as such, the resultant battery has a particularly high voltage that is charged to a cut-off voltage ranging from 4.3 to 4.5V.

A rechargeable lithium battery includes a positive electrode including a positive active material, a negative electrode including a negative active material, and the above-described electrolyte.

The positive active material may be selected from the group consisting of compounds represented by Formulas 2 to 12 and mixtures thereof.

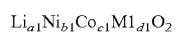

Formula 2 wherein $0.95 \le a1 \le 1.1$, $0 \le b1 \le 0.9$, $0 \le c1 \le 0.5$, $0 \le d1 \le 0.2$, and M1 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof. Furthermore, d1 may be $0.001 \le d1 \le 0.2$.

Formula 3 wherein $0.95 \le a2 \le 1.1$, $0 \le b2 \le 0.9$, $0 \le c2 \le 0.5$, $0 \le d2 \le 0.5$, $0 \le e1 \le 0.2$, and M2 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof. Furthermore, e1 may be $0.001 \le e1 \le 0.2$.

Formula 4 wherein $0.95 \le a3 \le 1.1$, $0 \le b3 \le 0.2$, and

M3 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof. Furthermore, b3 may be $0.001 \le b3 \le 0.2$.

Formula 5 wherein G is Ti or Mo.

Formula 6 wherein J is Ti or Mo.

$$V_2O_5 \quad \text{Formula 7}$$

$$LiV_2O_5 \quad \text{Formula 8}$$

$$LiTO_2 \quad \text{Formula 9}$$

wherein T is selected from the group consisting of Cr, V, Fe, Ti, Sc, Y, and combinations thereof.

$$LiNiVO_4 \quad \text{Formula 10}$$

$$Li_{(3-a4)}M'_2(PO_4)_3 \quad \text{Formula 11}$$

wherein $0<a4<3$, M' is selected from the group consisting of V, Cr, Mn, Co, Ni, Cu, and combinations thereof.

$$Li_{(3-a')}Fe_2(PO_4)_3 \quad \text{Formula 12}$$

wherein $0 \leq a' \leq 2$.

The positive electrode may have an active mass density ranging from 3.7 to 4.2 g/cm$^3$. The positive electrode may include the above-described positive active material, a binder, a conductive agent, and a positive current collector. The conductive agent may be omitted when not required.

The binder binds the active material particles together and also the positive active materials to a current collector. Examples of the binder include, but are not limited to, polyvinylalcohol, carboxylmethylcellulose, hydroxypropylcellulose, diacetylenecellulose, polyvinylchloride, polyvinylpyrrolidone, polytetrafluoroethylene, polyvinylidene fluoride, polyethylene, or polypropylene.

Any electrically conductive material may be used as a conductive agent unless it causes any chemical change or reacts undesirably with the other constituents. Examples of the conductive agent include natural graphite, artificial graphite, carbon black, acetylene black, ketjen black, a carbon fiber, a metal powder or a metal fiber including copper, nickel, aluminum, silver, etc., a polyphenylene derivative, or combinations thereof.

The positive current collector of the positive electrode may be an aluminum foil but is not limited thereto.

The negative active material in the negative electrode may include at least one selected from the group consisting of a carbonaceous material, a lithium metal, a lithium alloy, a material being capable of forming a lithium-containing compound, and combinations thereof. According to an embodiment, the carbonaceous material may be appropriate for the negative active material.

The carbonaceous material may be amorphous carbon or crystalline carbon. The amorphous carbon may be a soft carbon (carbon obtained by sintering at a low temperature), a hard carbon (carbon obtained by sintering at a high temperature), mesophase pitch carbide, fired coke, etc., and the crystalline carbon may be non-shaped, sheet, flake, spherical, or fiber shaped natural or artificial graphite.

The carbonaceous material has an Lc (crystallite size) of at least 10 nm found through Scherrer analysis of X-ray diffraction peaks. According to one embodiment, the carbonaceous material has an Lc of 10 to 1500 nm found through X-ray diffraction. The carbonaceous material exhibits an exothermic peak at 700° C. or more. The exothermic peak differentiates crystalline or amorphous carbon. The exothermic peak at 700° C. or more indicates that the carbon is crystalline carbon, and therefore, the maximum value of the exothermic temperature need not be limited.

The crystalline carbon may be a carbon prepared by carbonizing mesophase spherical particles and performing a graphitizing operation on the carbonized material. Further, the carbonaceous material may be a graphite fiber prepared by carbonizing a mesophase pitch fiber and performing a graphitizing operation on the carbonized material.

The lithium alloy that may be included in the negative active material includes lithium and a metal selected from the group consisting of Na, K, Rb, Cs, Fr, Be, Mg, Ca, Sr, Ba, Ra, Al, and Sn.

The material being capable of reversibly forming a lithium-containing compound by reaction with lithium ions which may also be included in the negative active material includes tin oxide ($SnO_2$), titanium nitrate, silicon (Si), etc., but is not limited thereto.

The negative electrode includes the above negative active material, a binder, a negative current collector, and optionally a conductive agent. The binder and conductive agent are the same as described with respect to the positive electrode and therefore their descriptions are not provided. The negative electrode includes a negative current collector, such as a copper foil, but is not limited thereto.

The negative electrode may be fabricated as follows. The negative active material composition is prepared by mixing the negative active material, the binder, and optionally the conductive agent, and then applying the composition to the negative current collector. TAs for the solvent used during fabrication of the electrode, any solvent may be used. For example, N-methylpyrrolidone may be used, but is not limited thereto.

The rechargeable lithium battery generally includes a positive electrode, a negative electrode, and an electrolyte. The battery may further include a separator, as needed. The separator may include any material used in conventional lithium secondary batteries. Non-limiting examples of suitable separator materials include polyethylene, polypropylene, polyvinylidene fluoride, and multi-layers thereof, such as a polyethylene/polypropylene double-layered separator, a polyethylene/polypropylene/polyethylene triple-layered separator, or a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, including cylindrical, prismatic, or coin-type batteries, and may be a thin film battery or larger in size.

The following examples illustrate aspects of the present invention in more detail. These examples, however, should not in any sense be interpreted as limiting the scope of the present invention.

Example 1

An LiCoO$_2$ positive active material, a polyvinylidene fluoride binder, and a SuperP conductive agent were mixed in a ratio of 96:2:2 wt % in an N-methylpyrrolidone solvent to prepare a positive active material slurry. The positive active material slurry was coated on an aluminum current collector and then dried and compressed to prepare a positive electrode. The positive electrode had an active mass density of 3.73 g/cm$^3$.

Next, a negative active material slurry was prepared by mixing an artificial graphite negative active material and a polyvinylidene fluoride binder in a ratio 94:6 wt % in an N-methylpyrrolidone solvent. The slurry was coated on a copper current collector and then dried and compressed to prepare a negative electrode. The graphite negative active material had an Lc of about 100 nm according to Scherrer analysis of X-ray diffraction peaks, and the graphite negative active material had an exothermic peak at more than 700° C.

Then, a 1.3M LiPF$_6$ electrolyte was prepared by dissolving LiPF$_6$ in a mixed solvent of ethylene carbonate, dimethyl carbonate, and ethylmethyl carbonate, which were mixed in a volume ratio of 30:30:40. The additive, including vinylene carbonate, fluoroethylene carbonate, and succinonitrile, was then added thereto. The vinylene carbonate, the fluoroethylene carbonate, and the succinonitrile were respectively included in an amount of 1 wt % based on the total weight of the electrolyte (i.e., the LiPF$_6$, the mixed solvent, and the additive).

A rechargeable lithium battery cell was fabricated using the above positive electrode, negative electrode, and electrolyte.

Example 2

A rechargeable lithium battery cell was fabricated in according to the same method as in Example 1, except that glutaronitrile was used instead of succinonitrile.

Example 3

A rechargeable lithium battery cell was fabricated according to the same method as in Example 1, except that adiponitrile was used instead of succinonitrile.

Example 4

A rechargeable lithium battery cell was fabricated according to the same method as in Example 1, except that pimelonitrile was used instead of succinonitrile.

Example 5

A rechargeable lithium battery cell was fabricated according to the same method as in Example 1, except that suberonitrile was used instead of succinonitrile.

Comparative Example 1

A positive active material slurry was prepared by mixing an LiCoO$_2$ positive active material, a polyvinylidene fluoride binder, and a SuperP conductive agent in a ratio of 96:2:2 wt % in an N-methylpyrrolidone solvent. The positive active material slurry was coated on an aluminum current collector and then dried and compressed to prepare a positive electrode. The positive electrode had active mass density of 3.73 g/cm$^3$.

Next, a negative active material slurry was prepared by mixing an artificial graphite negative active material and a polyvinylidene fluoride binder in a ratio of 94:6 wt % in an N-methylpyrrolidone solvent. The slurry was coated on a copper current collector and then dried and compressed to prepare a negative electrode. The graphite negative active material had an Lc of about 100 nm according to Scherrer analysis of X-ray diffraction peaks, and the graphite negative active material had an exothermic peak at more than 700° C.

Then, a 1.3M LiPF$_6$ electrolyte was prepared by dissolving LiPF$_6$ in a mixed solvent of ethylene carbonate, dimethyl carbonate, and ethylmethyl carbonate, which where mixed in a volume ratio of 30:30:40.

A rechargeable lithium battery cell was fabricated using the above positive electrode, negative electrode, and electrolyte.

Comparative Example 2

A rechargeable lithium battery cell was fabricated according to the same method as in Comparative Example 1, except that the electrolyte was prepared by mixing ethylene carbonate, dimethyl carbonate, ethylmethyl carbonate in a volume ratio of 30:30:40 to prepare a mixed solvent, and then dissolving LiPF$_6$ in the mixed solvent and adding vinylene carbonate to produce a 1.3M LiPF$_6$ electrolyte. Herein, the vinylene carbonate was included in an amount of 1 wt % based on the total weight of the electrolyte.

Comparative Example 3

A rechargeable lithium battery cell was fabricated according to the same method as in Comparative Example 1, except that the electrolyte was prepared by mixing ethylene carbonate, dimethyl carbonate, and ethylmethyl carbonate in a volume ratio of 30:30:40 to prepare a mixed solvent, and then dissolving LiPF$_6$ in the mixed solvent and adding fluoroethylene carbonate to produce a 1.3M LiPF$_6$ electrolyte. Herein, the fluoroethylene carbonate was included in an amount of 1 wt % based on the total weight of the electrolyte.

Comparative Example 4

A rechargeable lithium battery cell was fabricated according to the same method as in Comparative Example 1, except that the electrolyte was prepared by mixing ethylene carbonate, dimethyl carbonate, and ethylmethyl carbonate in a volume ratio of 30:30:40 to prepare a mixed solvent, and dissolving LiPF$_6$ in the mixed solvent and adding adiponitrile to produce a 1.3M LiPF$_6$ electrolyte. Herein, the adiponitrile was included in an amount of 1 wt % based on the total weight of the electrolyte.

Comparative Example 5

A rechargeable lithium battery cell was fabricated according to the same method as in Comparative Example 1, except that the electrolyte was prepared by mixing ethylene carbonate, dimethyl carbonate, ethylmethyl carbonate in a volume ratio of 30:30:40 to prepare a mixed solvent, and then dissolving LiPF$_6$ in the mixed solvent and adding vinylene carbonate and adiponitrile to produce a 1.3M LiPF$_6$ electrolyte. Herein, the vinylene carbonate and the adiponitrile were included in an amount of 1 wt % based on the total weight of the electrolyte.

Comparative Example 6

A rechargeable lithium battery cell was fabricated according to the same method as in Comparative Example 1, except that the electrolyte was prepared by mixing ethylene carbonate, dimethyl carbonate, and ethylmethyl carbonate in a volume ratio of 30:30:40 to prepare a mixed solvent, dissolving LiPF$_6$ in the mixed solvent and adding vinylene carbonate and fluoroethylene to produce a 1.3M LiPF$_6$ electrolyte. Herein, the vinylene carbonate and the fluoroethylene were included in an amount of 1 wt % based on the total weight of the electrolyte.

Comparative Example 7

A rechargeable lithium battery cell was fabricated according to the same method as in Comparative Example 1, except that the electrolyte was prepared by mixing ethylene carbonate, dimethyl carbonate, and ethylmethyl carbonate in a volume ratio of 30:30:40 to prepare a mixed solvent, dissolving LiPF$_6$ in the mixed solvent to prepare a 1.3M LiPF$_6$ electrolyte, and adding fluoroethylene and adiponitrile thereto.

Herein, the fluoroethylene carbonate and the adiponitrile were respectively included in an amount of 1 wt % based on the total weight of the electrolyte.

All of the rechargeable lithium battery cells according to Examples 1 to 5 and Comparative Examples 1 to 7 were charged at 0.2 C and then discharged at 0.2 C for a formation charge and discharge, and then charged at 0.5 C and discharged at 0.2 C for a standard charge and discharge. Subsequently, the cells were charged at 0.2 C to 4.35V. The rechargeable lithium batteries were all formed as 18650 cylindrical cells.

The battery cells were allowed to stand at 60° C., and after two weeks their OCVs were measured. The measurement results are shown in the following Table 1. In the following Table 1, SN denotes succinonitrile, GN denotes glutaronitrile, AN denotes adiponitrile, PN denotes pimelonitrile, and UN denotes suberonitrile. Further, a "y" indicates that the component listed was present in the example, and an "n" indicates that the component was not included in the example.

TABLE 1

|  | Vinylene carbonate | Fluoroethylene carbonate | Nitrile-based compound | OCV after 2 weeks (V) |
|---|---|---|---|---|
| Comparative Example 1 | n | n | n | 4.03 |
| Comparative Example 2 | y | n | n | 4.08 |
| Comparative Example 3 | n | y | n | 4.05 |
| Comparative Example 4 | n | n | AN | 4.10 |
| Comparative Example 5 | y | n | AN | 4.12 |
| Comparative Example 6 | y | y | n | 4.15 |
| Comparative Example 7 | n | y | AN | 4.13 |
| Example 1 | y | y | SN | 4.28 |
| Example 2 | y | y | GN | 4.30 |
| Example 3 | y | y | AN | 4.32 |
| Example 4 | y | y | PN | 4.33 |
| Example 5 | y | y | UN | 4.32 |

As shown in Table 1, the cells fabricated by using the electrolyte including vinylene carbonate, fluoroethylene carbonate, and a nitrile-based compound according to Examples 1 to 5 exhibited an OCV of 4.2V 2 weeks later, which indicates that the battery maintained the desired standard charge after having been stored at 60° C. for the 2-week period. In addition, among the nitrile-based compounds, glutaronitrile, adiponitrile, pimelonitrile, and suberonitrile may be preferable to succinonitrile. In contrast, the cells missing at least one of the compounds had OCVs of less than 4.2V.

Further examples were made to demonstrate the effect of weight percent of adiponitrile added to the electrolyte. The examples were based on Example 3 as described above.

Example 6

A rechargeable lithium battery cell was fabricated according to the same method as in Example 3, except that the amount of adiponitrile was changed from 1 wt % to 0.005 wt % based on the total weight of the electrolyte.

Example 7

A rechargeable lithium battery cell was fabricated according to the same method as in Example 3, except that the amount of adiponitrile was changed from 1 wt % to 0.01 wt % based on the total weight of the electrolyte.

Example 8

A rechargeable lithium battery cell was fabricated according to the same method as in Example 3, except that the amount of adiponitrile was changed from 1 wt % to 0.025 wt % based on the total weight of the electrolyte.

Example 9

A rechargeable lithium battery cell was fabricated according to the same method as in Example 3, except that the amount of adiponitrile was changed from 1 wt % to 0.05 wt % based on the total weight of the electrolyte.

Example 10

A rechargeable lithium battery cell was fabricated according to the same method as in Example 3, except that the amount of adiponitrile was changed from 1 wt % to 2 wt % based on the total weight of the electrolyte.

Example 11

A rechargeable lithium battery cell was fabricated according to the same method as in Example 3, except that the amount of adiponitrile was changed from 1 wt % to 5 wt % based on the total weight of the electrolyte.

Example 12

A rechargeable lithium battery cell was fabricated according to the same method as in Example 3, except that the amount of adiponitrile was changed from 1 wt % to 10 wt % based on the total weight of the electrolyte.

Comparative Example 8

A rechargeable lithium battery cell was fabricated according to the same method as in Example 3, except that the amount of adiponitrile was changed from 1 wt % to 0.001 wt % based on the total weight of the electrolyte.

Comparative Example 9

A rechargeable lithium battery cell was fabricated according to the same method as in Example 3 except that the amount of adiponitrile was changed from 1 wt % to 20 wt % based on the total weight of the electrolyte.

The 18650 cylindrical rechargeable lithium battery cells fabricated according to Examples 6 to 12 and Comparative Examples 8 and 9 were charged at 0.2 C and then discharged at 0.2 C for a formation charge and discharge, and then charged at 0.5 C and discharged at 0.2 C for a standard charge and discharge. Subsequently, the cells were charged at 0.2 C to 4.35V.

The battery cells were allowed to stand at 60° C., and after two weeks, their OCVs were measured. The measurement results are shown in the following Table 2. For comparison, the measurement results of Example 3 and Comparative Example 6 are also shown in the following Table 2.

TABLE 2

|  | Adiponitrile content (wt %) | OCV after 2 weeks (V) |
| --- | --- | --- |
| Comparative Example 6 | 0 | 4.15 |
| Comparative Example 8 | 0.001 | 4.19 |
| Example 6 | 0.005 | 4.21 |
| Example 7 | 0.01 | 4.25 |
| Example 8 | 0.025 | 4.26 |
| Example 9 | 0.05 | 4.28 |
| Example 3 | 1 | 4.32 |
| Example 10 | 2 | 4.31 |
| Example 11 | 5 | 4.30 |
| Example 12 | 10 | 4.21 |
| Comparative Example 9 | 20 | 4.11 |

As shown in Table 2, when an electrolyte including adiponitrile in an amount of 0.005 to 10 wt % was used to fabricate the cells according to Examples 3 and 6 to 12, the cells had OCVs of more than 4.2V after having been stored at 60° C. for 2 weeks, which meets the standards necessary for the battery. However, when adiponitrile is included at an amount outside the specified range as demonstrated by Comparative Examples 6, 8, and 9, the cells had OCVs of less than 4.2V. Accordingly, adiponitrile may be included in the electrolyte at an amount ranging from 0.005 to 10 wt %.

Further examples were made to illustrate the effects of the amount of vinylene carbonate on the OCV after storage at 60° C. for two weeks. The examples were based again on the Example 3 as described above.

Example 13

A rechargeable lithium battery cell was fabricated according to the same method as in Example 3, except that the amount of vinylene carbonate was changed from 1 wt % to 0.01 wt % based on the total weight of the electrolyte.

Example 14

A rechargeable lithium battery cell was fabricated according to the same method as in Example 3, except that the amount of vinylene carbonate was changed from 1 wt % to 0.5 wt % based on the total weight of the electrolyte.

Example 15

A rechargeable lithium battery cell was fabricated according to the same method as in Example 3, except that the amount of vinylene carbonate was changed from 1 wt % to 2 wt % based on the total weight of the electrolyte.

Example 16

A rechargeable lithium battery cell was fabricated according to the same method as in Example 3, except that the amount of vinylene carbonate was changed from 1 wt % to 3 wt % based on the total weight of the electrolyte.

Example 17

A rechargeable lithium battery cell was fabricated according to the same method as in Example 3, except that the amount of vinylene carbonate was changed from 1 wt % to 5 wt % based on the total weight of the electrolyte.

Example 18

A rechargeable lithium battery cell was fabricated according to the same method as in Example 3, except that the amount of vinylene carbonate was changed from 1 wt % to 7 wt % based on the total weight of the electrolyte.

Example 19

A rechargeable lithium battery cell was fabricated according to the same method as in Example 3, except that the amount of vinylene carbonate was changed from 1 wt % to 9 wt % based on the total weight of the electrolyte.

Comparative Example 10

A rechargeable lithium battery cell was fabricated according to the same method as in Example 3, except that the amount of vinylene carbonate was changed from 1 wt % to 10 wt % based on the total weight of the electrolyte.

Comparative Example 11

A rechargeable lithium battery cell was fabricated according to the same method as in Example 3, except that the amount of vinylene carbonate was changed from 1 wt % to 20 wt % based on the total weight of the electrolyte.

The 18650 cylindrical rechargeable lithium battery cells according to Examples 13 to 19 and Comparative Examples 10 and 11 were charged at 0.2 C and then discharged at 0.2 C for a formation charge and discharge, and then charged at 0.5 C and discharged at 0.2 C for a standard charge and discharge. Subsequently, the cells were charged at 0.2 C to 4.35V.

The battery cells were allowed to stand at 60° C., and after two weeks, their OCVs were measured. The measurement results are shown in the following Table 3. For comparison, the measurement results of Example 3 and Comparative Example 7 are also shown in the following Table 3.

TABLE 3

|  | Vinylene carbonate content (wt %) | OCV after 2 weeks (V) |
| --- | --- | --- |
| Comparative Example 7 | 0 | 4.13 |
| Example 13 | 0.01 | 4.20 |
| Example 14 | 0.5 | 4.25 |
| Example 3 | 1 | 4.32 |
| Example 15 | 2 | 4.33 |
| Example 16 | 3 | 4.31 |
| Example 17 | 5 | 4.27 |
| Example 18 | 7 | 4.25 |
| Example 19 | 9 | 4.22 |
| Comparative Example 10 | 10 | 4.18 |
| Comparative Example 11 | 20 | 4.10 |

As shown in Table 3, the cells fabricated with an electrolyte including vinylene carbonate in an amount of 0.01 to 9 wt % according to Examples 3 and 13 to 19 all had OCVs of more than 4.2V after two weeks of storage at 60° C. However, when vinylene carbonate is included at an amount outside the specified range as demonstrated by Comparative Examples 7, 10, and 11, the cells had OCVs of less than 4.2V. Accordingly, vinylene carbonate may be included in an amount ranging from 0.01 to 9 wt %.

Further examples were made to demonstrate the effect of changing the amount of fluoroethylene carbonate on the OCV after storage for 2 weeks at 60° C. The below examples were based again on Example 3 as described above.

Example 20

A rechargeable lithium battery cell was fabricated according to the same method as in Example 3, except that the amount of fluoroethylene carbonate was changed from 1 wt % to 0.1 wt % based on the total weight of the electrolyte.

Example 21

A rechargeable lithium battery cell was fabricated according to the same method as in Example 3, except that the amount of fluoroethylene carbonate was changed from 1 wt % to 0.5 wt % based on the total weight of the electrolyte.

Example 22

A rechargeable lithium battery cell was fabricated according to the same method as in Example 3, except that the amount of fluoroethylene carbonate was changed from 1 wt % to 3 wt % based on the total weight of the electrolyte.

Example 23

A rechargeable lithium battery cell was fabricated according to the same method as in Example 3, except that the amount of fluoroethylene carbonate was changed from 1 wt % to 5 wt % based on the total weight of the electrolyte.

Example 24

A rechargeable lithium battery cell was fabricated according to the same method as in Example 3, except that the amount of fluoroethylene carbonate was changed from 1 wt % to 7 wt % based on the total weight of the electrolyte.

Comparative Example 12

A rechargeable lithium battery cell was fabricated according to the same method as in Example 3, except that the amount of fluoroethylene carbonate was changed from 1 wt % to 0.01 wt % based on the total weight of the electrolyte.

Comparative Example 13

A rechargeable lithium battery cell was fabricated according to the same method as in Example 3, except that the amount of fluoroethylene carbonate was changed from 1 wt % to 0.05 wt % based on the total weight of the electrolyte.

Comparative Example 14

A rechargeable lithium battery cell was fabricated according to the same method as in Example 3, except that the amount of fluoroethylene carbonate was changed from 1 wt % to 9 wt % based on the total weight of the electrolyte.

Comparative Example 15

A rechargeable lithium battery cell was fabricated according to the same method as in Example 3, except that the amount of fluoroethylene carbonate was changed from 1 wt % to 10 wt % based on the total weight of the electrolyte.

Comparative Example 16

A rechargeable lithium battery cell was fabricated according to the same method as in Example 3, except that the amount of fluoroethylene carbonate was changed from 1 wt % to 11 wt % based on the total weight of the electrolyte.

The 18650 cylindrical rechargeable lithium battery cells according to Examples 20 to 24 and Comparative Examples 12 to 16 were charged at 0.2 C and then discharged at 0.2 C for a formation charge and discharge, and then charged at 0.5 C and discharged at 0.2 C for a standard charge and discharge. Subsequently, the cells were charged at 0.2 C to 4.35V.

The battery cells were allowed to stand at 60° C., and after two weeks, their OCVs were measured. The measurement results are shown in the following Table 4. For comparison, the measurement results of Example 3 and Comparative Example 4 are also shown in the following Table 4.

TABLE 4

|  | Fluoroethylene carbonate content (wt %) | OCV after 2 weeks (V) |
| --- | --- | --- |
| Comparative Example 4 | 0 | 4.12 |
| Comparative Example 12 | 0.01 | 4.17 |
| Comparative Example 13 | 0.05 | 4.19 |
| Example 20 | 0.1 | 4.20 |
| Example 21 | 0.5 | 4.24 |
| Example 3 | 1 | 4.32 |
| Example 22 | 3 | 4.28 |
| Example 23 | 5 | 4.27 |
| Example 24 | 7 | 4.22 |
| Comparative Example 14 | 9 | 4.19 |
| Comparative Example 15 | 10 | 4.18 |
| Comparative Example 16 | 11 | 4.11 |

As shown in Table 4, the cells fabricated with an electrolyte including 0.1 to 7 wt % of fluoroethylene carbonate according to Examples 3 and 20 to 24 had OCVs of 4.2V after storage at 60° C. for 2 weeks. However, when fluoroethylene carbonate is included at an amount outside the specified range as demonstrated by Comparative Examples 4, and 12 to 16, the cells had OCVs of less than 4.2V. Accordingly, fluoroethylene carbonate may be included in an amount ranging from 0.1 to 7 wt %.

From the results in Tables 1 to 4, when vinylene carbonate was included at an amount ranging from 0.01 to 9 wt %, fluoroethylene carbonate was included at an amount ranging from 0.1 to 7 wt %, and a nitrile-based compound, such as adiponitrile, was included at an amount ranging from 0.005 to 10 wt % to prepare an electrolyte, a cell including the electrolyte demonstrated excellent storage stability at a high temperature.

As described above, an electrolyte according to aspects of the present invention provides a rechargeable lithium battery with excellent storage stability at a high temperature. Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A rechargeable lithium battery comprising:

a positive electrode comprising a positive active material;

a negative electrode comprising a negative active material; and a non-aqueous electrolyte, comprising:

a non-aqueous organic solvent, a lithium salt, and an additive including vinylene carbonate, fluoroethylene carbonate, and a nitrile-based compound selected from the group consisting of succinonitrile, glutaronitrile, adiponitrile, pimelonitrile, suberonitrile, and combinations thereof, wherein the vinylene carbonate is present at an amount of 0.01 to 9 wt % based on the total weight of the electrolyte, wherein the fluoroethylene carbonate is present at an amount of 0.1 to 7 wt % based on total weight of the electrolyte, and wherein the nitrile-based compound is present at an amount of 0.005 to 10 wt % based on the total weight of the electrolyte.

2. The rechargeable lithium battery of claim 1, wherein the vinylene carbonate is present in an amount of 0.5 to 5 wt % based on the total weight of the electrolyte.

3. The rechargeable lithium battery of claim 1, wherein the fluoroethylene carbonate is present in an amount of 0.5 to 5 wt % based on the total weight of the electrolyte.

4. The rechargeable lithium battery of claim 1, wherein the nitrile-based compound is present in an amount of 0.01 to 5 wt % based on the total weight of the electrolyte.

5. The rechargeable lithium battery of claim 1, wherein the nitrile-based compound is selected from the group consisting of glutaronitrile, adiponitrile, pimelonitrile, suberonitrile, and combinations thereof.

6. The rechargeable lithium battery of claim 5, wherein the nitrile-based compound is adiponitrile.

7. The rechargeable lithium battery of claim 1, wherein the positive electrode has an active mass density ranging from 3.7 to 4.2 g/cm$^3$.

8. The rechargeable lithium battery of claim 1, wherein the rechargeable lithium battery is charged to a cut-off voltage of 4.3 to 4.5V.

9. The rechargeable lithium battery of claim 1, wherein the positive active material is selected from the group consisting of compounds represented by the following Formulas 2 to 12 and mixtures thereof:

$$Li_{a1}Ni_{b1}Co_{c1}M1_{d1}O_2, \qquad \text{Formula 2}$$

wherein $0.95 \le a1 \le 1.1$, $0 \le b1 \le 0.9$, $0 \le c1 \le 0.5$, $0 \le d1 \le 0.2$, and M1 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof;

$$Li_{a2}Ni_{b2}Co_{c2}Mn_{d2}M2_{e1}O_2, \qquad \text{Formula 3}$$

wherein $0.95 \le a2 \le 1.1$, $0 \le b2 \le 0.9$, $0 \le c2 \le 0.5$, $0 \le d2 \le 0.5$, $0 \le e1 \le 0.2$, and M2 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof;

$$Li_{a3}Mn_2M3_{b3}O_4, \qquad \text{Formula 4}$$

wherein $0.95 \le a3 \le 1.1$, $0 \le b3 \le 0.2$, and M3 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and combinations thereof;

$$GS_2, \qquad \text{Formula 5}$$

wherein G is Ti or Mo;

$$LiJS_2, \qquad \text{Formula 6}$$

wherein J is Ti or Mo;

$$V_2O_5; \qquad \text{Formula 7}$$

$$LiV_2O_5; \qquad \text{Formula 8}$$

$$LiTO_2, \qquad \text{Formula 9}$$

wherein T is selected from the group consisting of Cr, V, Fe, Ti, Sc, Y, and combinations thereof;

$$LiNiVO_4; \qquad \text{Formula 10}$$

$$Li_{(3-a4)}M'_2(PO_4)_3, \qquad \text{Formula 11}$$

wherein $0 < a4 < 3$, M' is selected from the group consisting of V, Cr, Mn, Co, Ni, Cu, and combinations thereof; and $$Li_{(3-a')}Fe_2(PO_4)_3 \qquad \text{Formula 12}$$

wherein $0 \le a' \le 2$.

10. The rechargeable lithium battery of claim 9, wherein d1 is in the range of $0.001 \le d1 \le 0.2$.

11. The rechargeable lithium battery of claim 9, wherein e1 is in the range of $0.001 \le e1 \le 0.2$.

12. The rechargeable lithium battery of claim 9, wherein b3 is in the range of $0.001 \le b3 \le 0.2$.

13. The rechargeable lithium battery of claim 1, wherein the negative active material is selected from the group consisting of a carbonaceous material, a lithium metal, a lithium alloy, a material being capable of forming a lithium-containing compound, and combinations thereof.

14. The rechargeable lithium battery of claim 13, wherein the negative active material is a carbonaceous material.

15. The rechargeable lithium battery of claim 14, wherein the carbonaceous material has a crystallite size of at least 10 nm, and exhibits an exothermic peak at 700° C. or more.

16. The rechargeable lithium battery of claim 14, wherein the carbonaceous material is a carbon prepared by carbonizing mesophase spherical particles and performing a graphitizing operation on the carbonized material, or a graphite fiber prepared by carbonizing a mesophase pitch fiber and performing a graphitizing operation on the carbonized material.

* * * * *